(12) United States Patent
Lan

(10) Patent No.: US 7,403,882 B2
(45) Date of Patent: Jul. 22, 2008

(54) MATERIAL HANDLING SYSTEM ENABLING ENHANCED DATA CONSISTENCY AND METHOD THEREOF

(75) Inventor: Wen-Cheng Lan, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 579 days.

(21) Appl. No.: 11/031,778

(22) Filed: Jan. 7, 2005

(65) Prior Publication Data

US 2006/0155409 A1  Jul. 13, 2006

(51) Int. Cl.
*G06G 7/48* (2006.01)

(52) U.S. Cl. .................. 703/6; 700/108; 700/112; 700/121

(58) Field of Classification Search .......... 703/2, 703/6; 700/95–97, 108, 112–117, 121
See application file for complete search history.

(56) References Cited

U.S. PATENT DOCUMENTS

| 5,311,438 A | * | 5/1994 | Sellers et al. | 700/96 |
| 6,256,550 B1 | * | 7/2001 | Wu et al. | 700/121 |
| 2005/0177353 A1 | * | 8/2005 | Slater | 703/6 |

OTHER PUBLICATIONS

Li et al., B. Factory Throughput Improvements Through Intelligent Integrated Delivery in 300 mm Wafer Manufacturing, 2003 IEEE Int. Symposium on Semiconductor Manufacturing, Sep. 2003, pp. 59-62.*

Wright et al., R. Effects of Metrology Load Port Buggering in Automated 300 mm Factories, Proceedings of the Winter Simulation Conf. Dec. 2002, pp. 1359-1364.*

Biswas et al., A. Productivity Enhancement Through Simulation and Queuing Network Analysis, 1994 Winter Simulation Conf. Proceedings, Dec. 1994, pp. 1447-1450.*

Horn et al., G. A Focus on Cycle Time-VS.-Tool Utilization "Paradox" Material Handling Methodology, 1998 IEEE/SEMI Advanced Semiconductor Manufacturing Conf. and Workshop, Sep. 1998, pp. 405-412.*

Gudmundsson et al., D. Estimating and Optimizing Throughput of a Robotic Part Feeder Using Queuing Theory, 1998 IEEE/RSJ Int. Conf. on Intelligent Robots and Systems, Oct. 1998, pp. 818-824.*

* cited by examiner

*Primary Examiner*—Russell Frejd
(74) *Attorney, Agent, or Firm*—Thomas, Kayden, Horstemeyer & Risley

(57) ABSTRACT

Material handling systems that enable enhanced data consistency, and methods thereof, are disclosed. Behavior and life cycle of a semiconductor product for a material handling system are modeled in a set of finite states and trigger paths. A trigger event corresponding to a second finite state is generated when a transfer state of the product changes from a first finite state to a second finite state along trigger paths. Next, it is determined whether the trigger event complies with a predetermined control rule. Transport data between manufacturing execution and material handling systems is synchronized by message exchange.

20 Claims, 3 Drawing Sheets

MATERIAL HANDLING SYSTEM ENABLING ENHANCED DATA CONSISTENCY AND METHOD THEREOF

BACKGROUND OF THE INVENTION

1. Field of the Invention

The present invention relates generally to data synchronization, and, particularly, to material handling using queue time (Q-time) finite state confirmation to perform data synchronization.

2. Description of the Related Art

Manufacturing execution systems (MESs) assist production management staff in gathering field data and controlling field manufacturing procedures to provide enterprises with solutions for improved processes and productive benefit. MES is an information system integrating procedures of orders, suppliers, product management, production, equipment maintenance and quality control. Output data, either equipment settings or engineering data collection, from MES in wafer manufacturing is rather complex. In addition, data for synchronously updating production management systems or material management systems must typically be precise. It is important for MES to have an instantaneous and dependable data transmission environment.

Automated material handling systems (AMHS) transfer wafer lots between tools in wafer fabrication. Conventionally, material transfer in wafer fabrication is performed by wheel-based systems, increasing costs as wafer size increases from six inches to twelve inches. Furthermore, to optimize yield rate and purity, automated material handling has become standard in wafer fabrication.

MESs handle and locate lot positions of wafers based on messages from monitoring applications through the semiconductor equipment communication standard (SECS) protocol, especially for event-driven material handling systems (MHSs). Automated material handling must cooperate with MES real-time transfers. If transfer event reports from AMHS are lost or delayed, transport data from the MES will be inconsistent with real wafer process. However, delayed or missing messages are difficult to detect and recover in an event-driven MHS.

Furthermore, wafer lot movement is difficult to predict because of unbalanced loading and varied patterns of communication between host and tools, such that some critical transfer messages are delayed. Disconnection between the manufacturing execution and AMHSs can lose transfer messages such that the AMHS misses errors. Regular inventory of goods can solve this issue, but it is time consuming and less efficient. In addition, lost data may be caused by software bugs in the AMHS, creating additional costs to repair the program.

In view of this, what is called for is a system to reduce product search time and detect lost messages to enhance data consistency between manufacturing execution and AMHSs, and stabilize system software and hardware, thereby lowering manufacturing costs.

SUMMARY

Accordingly, an object of the present invention is to provide an MHS that enables enhanced data consistency between an MES and MHSs.

Another object of the invention is to provide A method for material handling that detects trigger events according to Q-time finite state confirmation, verifies transfer conditions of a wafer lot and enhances data consistency for event-driven MHSs, thereby effectively reducing missing lots and decreasing lot search times.

Some embodiments of the present invention include an MHS comprising a data modeling unit, a data processing unit, and a data synchronization unit.

The data modeling unit models behavior and life cycle of a wafer lot for the MHS in a set of finite states and trigger paths. The finite states and trigger paths form a finite state confirmation diagram. This results in an obtaining of a first finite state and a second finite state.

Next, the data processing unit generates a trigger event corresponding to the second finite state when a transfer state of the wafer lot changes from the first finite state to the second finite state along the trigger paths. A Q-time is issued, and the first finite state changes to the second finite state within the Q-time if the first finite state is temporary. In addition, the data processing unit sets a flag with flag value being updated when the transfer state changes from the first finite state to the second finite state. The state of the trigger event is determined according to the flag value.

Finally, the data synchronization unit verifies whether the trigger event complies with a predetermined control rule. Thereafter, the data synchronization unit synchronizes transport data between the MES and the MHSs by exchanging messages that are compliant with the SECS protocol.

Embodiments of the present invention further provide methods of material handling that enable enhanced data consistency between an MES and MHSs. First, behavior and life cycle of a wafer lot for an MHS are modeled in a set of finite states and trigger paths. The finite states and trigger paths form a finite state confirmation diagram. Consequently, a first finite state and a second finite state are obtained.

A trigger event corresponding to the second finite state is generated when a transfer state of the wafer lot changes from the first finite state to the second finite state along the trigger paths. A Q-time is issued, and the first finite state changes to the second finite state within the Q-time if the first finite state is temporary. In addition, a flag, with flag value being updated when the transfer state changes from the first finite state to the second finite state, is set, and the state of the trigger event is determined according to the flag value.

It is determined whether the trigger event complies with a predetermined control rule, and transport data between the MES and the MHSs is synchronized by exchanging messages that are compliant with the SECS protocol.

The method, according to some embodiments of the present invention, verifies transfer conditions of a wafer lot, improves data consistency for event-driven MHSs, reduces missing lots, and decreases lot search times.

A detailed description is given in the following embodiments with reference to the accompanying drawings.

BRIEF DESCRIPTION OF THE DRAWINGS

The present invention can be more fully understood by reading the detailed description and examples with references made to the accompanying drawings, wherein.

DETAILED DESCRIPTION

Accordingly, the present disclosure provides A method for material handling that utilizes Q-time finite state confirmation to enhance data consistency between an MES and MHSs.

A finite state is an operational module formed by an initial state, a set of possible inputs, a set of new states derived from the possible inputs, and a set of actions or outputs derived from the possible inputs.

One finite state includes the following attributes: state ID, state sequence number, possible subsequent state, trigger events corresponding to each subsequent state, and value of Q-time. Once a wafer lot enters the MHS, its finite state is initialized and begins changing. If an event occurs in the MHS, then the MES determines whether the event is consistent with trigger events. If an illegal state transition occurs, then the MES registers the event as an abnormal event.

There are both fixed and temporary finite states. The Q-time is not issued if a finite state is fixed. However, the fixed finite state changes to the subsequent state within the Q-time. The MES issues an observation record once a finite state of a wafer lot changes to a temporary state. When the MES is informed of any illegal state transition event, it acquires the real location and transfer state of the wafer lot actively to update transport data in the MHS.

Figure 1:
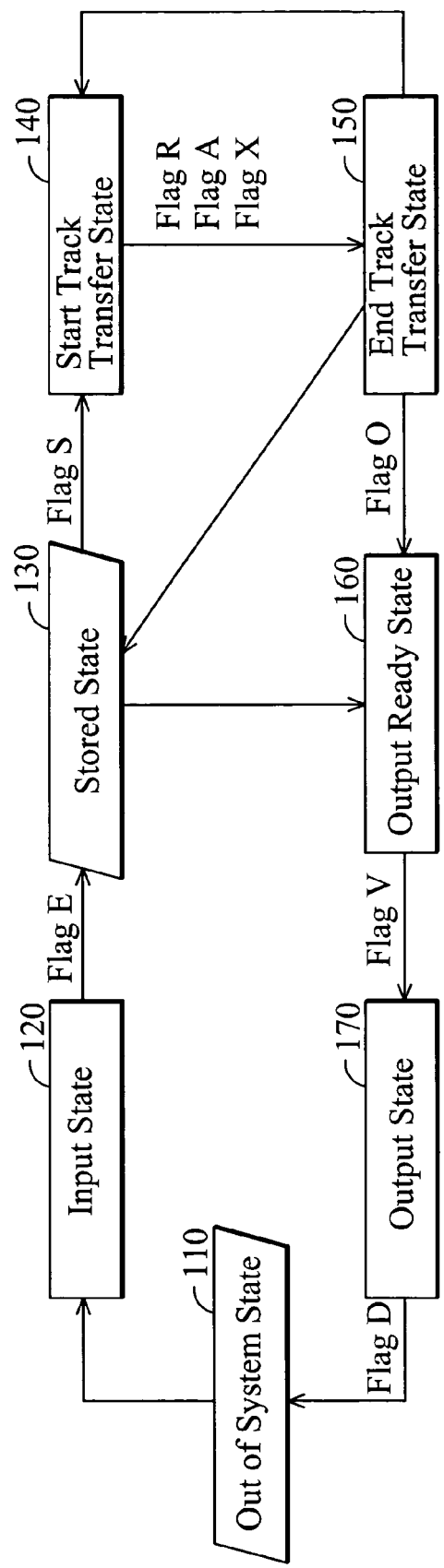
FIG. 1 is a flowchart of the system utilizing Q-time finite state confirmation according to an embodiment of the present invention.

FIG. 1 is a flowchart of the system utilizing Q-time finite state confirmation according to an embodiment of the present invention. Transfer behavior and life cycle of a product for the MHS are modeled in a set of finite states and trigger paths to form a Q-time finite state confirmation diagram.

Transfer conditions of a wafer lot defined by the MHS differ from each other according to different workflows and are not limited to the disclosed embodiments. Transfer conditions of a wafer lot are defined as out of system state 110, input state 120, stored state 130, start track transfer state 140, end track transfer state 150, output ready state 160, and output state 170. The MHS issues events corresponding to transfer conditions to the MES to determine the current process phase of the wafer lot. In addition, the MES can issue voluntary requests to the MHS to report the current transfer state of the wafer lot. Furthermore, since a transfer state changes to the subsequent state along a trigger path almost instantaneously (at a trigger point), a trigger event corresponding thereto is generated.

The transfer state of the wafer lot exits system state 110 when it has not yet entered the MHS. The MHS issues a tag data report event to the MES upon entry. The tag data attached to the wafer carrier comprises information relating to the entering wafer lot.

The wafer lot is transferred to the input port to await entry into the track. The transfer state changes to input state 120 when the wafer lot enters the track, and the MHS issues a transfer state report event to notify the MES that the wafer lot is on the track and is being transferred to the next location. A flag is set with flag value updated in accordance with different transfer conditions to determine the current transfer state of the wafer lot.

Out of system state 110 and stored state 130 are fixed states, and input state 120, start track transfer state 140, end track transfer state 150, output ready state 160, and output state 170 are temporary states. The MHS issues a Q-time for temporary states within which transfer states change to subsequent states.

Next, when the wafer lot has been transferred to a stocker, the transfer state changes to stored state 130 with flag value Flag E. The wafer lot is not stored in the stocker until a transfer command is issued to the MHS.

A transfer command is issued to the MHS to move the wafer lot to the next station, and the transfer state changes to start track transfer state 140 with flag value Flag S. When the wafer lot is in transit, it moves to the next station if no other commands are issued to the MHS. The transfer state changes from start track transfer state 140 to end track transfer state 150 with flag value Flag R, Flag A, and Flag X when the wafer lot leaves the track for the stocker.

Next, the transfer state changes from end track transfer state 150 to stored state 130 with flag value Flag S when the wafer lot is in the stocker. If the wafer lot is in transit, a transfer command is issued to the MHS to remove the wafer lot, and the transfer state changes from stored state 130 to output ready state 160 with flag value Flag O. Thus, the wafer lot is transferred to the output port.

A transfer command is then issued to the MHS to remove the wafer lot, and the transfer state changes from stored state 130 to output ready state 160. Thus, the wafer lot is transferred to the output port.

The wafer lot, in transit on the output port, has its transfer state changed to output state 170 with flag value Flag V when the wafer lot has been moved to the outlet. The transfer state changes to out of system state 110 with flag value Flag D when the wafer is removed, and transfer is complete.

In addition, if there are two tracks, the transfer state starts track transfer state 140 when the wafer lot is on the first track. The transfer state then changes to end track transfer state 150 with flag value Flag R, Flag A, and Flag X when the wafer lot leaves the first track, if a transfer command is issued to the MHS to move the wafer lot onto the second track. The transfer state then changes to start track transfer state 140 with flag value Flag S when the wafer lot moves to the second track.

The MHS monitors trigger events and transfer conditions, determines whether the trigger events comply with a predetermined control rule, and synchronizes transport data between the MES and the MHSs by message exchange.

Figure 2:
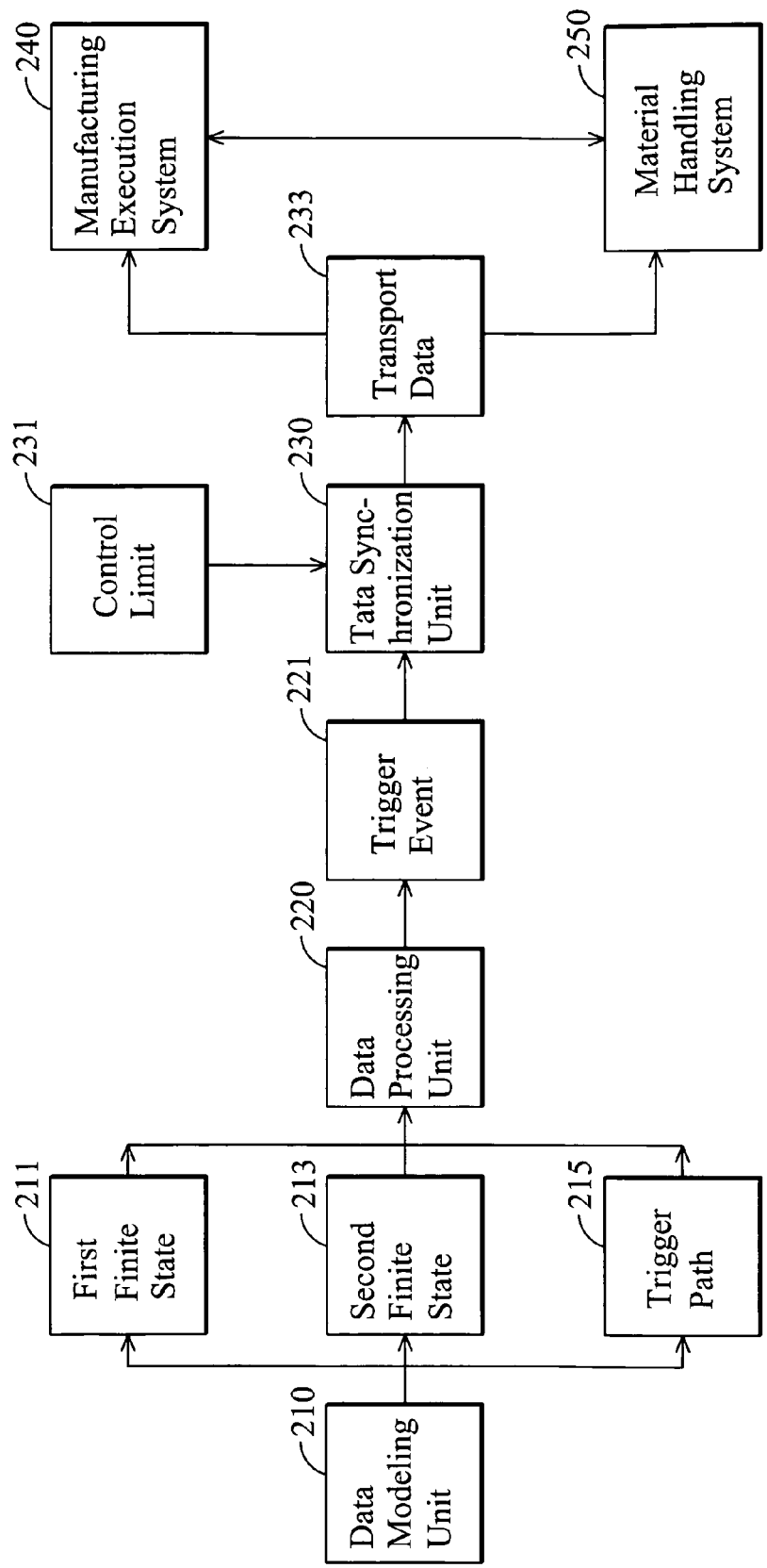
FIG. 2 is a diagram showing the architecture of the MHS that enables enhanced data consistency according to an embodiment of the present invention.

FIG. 2 is a diagram showing the architecture of the MHS enabling enhanced data consistency according to an embodiment of the present invention.

The architecture comprises a data modeling unit 210, a data processing unit 220 and a data synchronization unit 230. The data modeling unit 210 models behavior and life cycle of a wafer lot for an the MHS in a set of finite states and trigger paths. The finite states and the trigger paths form Q-time finite state confirmation diagram, thereby obtaining a first finite state 211, a second finite state 213, and a trigger path 215.

The data processing unit 220 generates trigger event 221 corresponding to second finite state 213 when the transfer state of the wafer lot changes from first finite state 211 to second finite state 213. In addition, a Q-time is issued, within which the first finite state 211 changes to the second finite state 213 if it is temporary. A flag is set to determine the state of the trigger event 221, updated as the first finite state 211 changes to the second finite state 213.

The data synchronization unit 230 determines whether trigger event 221 complies with predetermined control limit 231 and synchronizes transport data 233 between the MES 240 and the MHS 250 in accordance with verification results.

Figure 3:
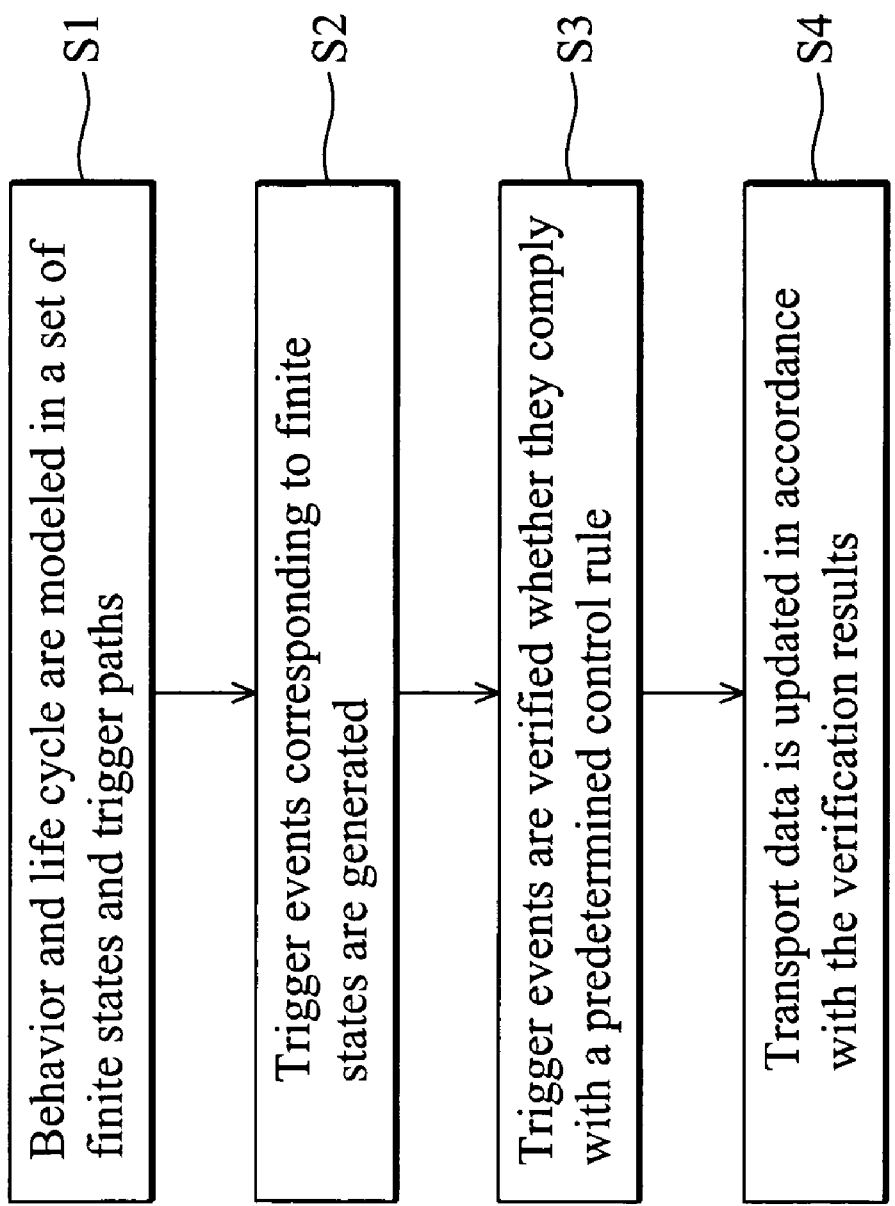
FIG. 3 is a flowchart of the detailed steps of the method that enables enhanced data consistency according to an embodiment of the present invention.

FIG. 3 is a flowchart of the detailed steps of the method enabling enhanced data consistency according to an MHS.

An embodiment of the method provides an MHS with Q-time finite state confirmation, introduced into an event-driven MHS to acquire real location and monitoring transfer conditions of a wafer lot. An example embodiment includes the following steps.

In step S1, behavior and life cycle of a wafer lot for the MHS are modeled in a set of finite states and trigger paths for a product in the MHS. The finite states and trigger paths form a Q-time finite state confirmation diagram. The finite states, according to the embodiment, comprise out of system state, input state, stored state, start track transfer state, end track transfer state, output ready state, and output state as shown in FIG. 1.

In step S2, trigger events corresponding to finite states are generated. The system generates a trigger event corresponding to the stored state when the transfer state of the wafer lot changes from the input state to the stored state along trigger paths. The trigger event is generated from a trigger point. In addition, a Q-time is issued for monitoring temporary and changed states of the wafer lot, within which a finite state changes to the subsequent state if it is temporary. Furthermore, a finite state maintains state if it is fixed, unless a transfer command is issued to the MHS to remove the wafer.

In step S3, it is determined whether trigger events comply with a predetermined control rule. The MHS monitors trigger events and transfer conditions during the transfer. The MHS also determines whether the trigger events comply with a predetermined control rule. Furthermore, the MHS generates verification results corresponding to the trigger events.

In step S4, transport data is updated in accordance with the verification results. The system synchronizes transport data between the MES and the MHSs by message exchange.

The disclosed approach provides enhanced data consistency for wafer transport information for the MES and the MHSs. Additionally, the disclosed approach detects unpredictable events and lost or delayed messages. Furthermore, the disclosed approach reduces missing lots and decreases lot search time in semiconductor fabrication. Moreover, the disclosed approach obtains accurate transport data without altering software or components in the bottom layer of the material handling hardware.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for material handling, the method comprising steps of:
    defining a queue time;
    modeling behavior and life cycle of a product for a material handling system to obtain a first finite state, a second finite state, and a trigger path, wherein the second finite state is selected from a group consisting of
    a fixed states and
    a temporary state; and
    generating a trigger event corresponding to the second finite state, the triggering event being generated in response to a transfer state changing from the first finite state to the second finite state,
    wherein, in response to the second finite state being the temporary state, the first finite state changes to the second finite state within the queue time.

2. The method as claimed in claim 1 further comprising the step of setting a flag with a flag value, the flag value being updated when the transfer state changes from the first finite state to the second finite state.

3. The method as claimed in claim 1, wherein the first finite state does not change within the queue time if it is fixed.

4. The method as claimed in claim 1, wherein the first finite state comprises state ID, state sequence number, possible subsequent state, trigger events corresponding to each subsequent state, and queue time value, and
    the second finite state comprises state ID, state sequence number, possible subsequent state, trigger events corresponding to each subsequent state, and queue time value.

5. The method as claimed in claim 1, wherein the generating step comprises the step of generating the trigger event from a trigger point.

6. The method as claimed in claim 1, further comprising the step of verifying whether the trigger event complies with a predetermined control rule; and
    synchronizing transport data between the manufacturing execution system and the material handling system in response to verifying whether the trigger event complies with a predetermined control rule.

7. The method as claimed in claim 6, wherein the synchronizing step comprises the steps of:
    obtaining the transport data in response to verifying whether the trigger event complies with a predetermined control rule, wherein the transport data is obtained by the manufacturing execution system; and
    synchronizing the manufacturing execution system with the material handling system by exchanging messages.

8. The method as claimed in claim 7, wherein the step of exchanging messages comprises the step of exchanging messages that comply with semiconductor equipment communication standard (SECS) protocol.

9. A material handling system that enables enhanced data consistency, the system comprising:
    a data modeling unit, modeling behavior and life cycle of a product for the material handling system to obtain a first finite state, a second finite state, and a trigger path, the second state being one selected from a group consisting of
    a temporary states and
    a fixed state; and
    a data processing unit coupled with the data modeling unit for generating a trigger event corresponding to the second finite state in response to a transfer state changing from the first finite state to the second finite state, wherein in response to the second finite state being the temporary state, the first finite state changes to the second finite state within a defined queue time, wherein the data modeling unit and the data processing unit are physical computer-based components comprising a combination of hardware and software.

10. The system as claimed in claim 9, wherein the data processing unit is further configured to set a flag, the flag having a flag value, the flag value being updated when the transfer state changes from the first finite state to the second finite state.

11. The system as claimed in claim 9, wherein the first finite state does not change within the queue time if it is fixed.

12. The system as claimed in claim 9,
    wherein the first finite state comprises state ID, state sequence number, possible subsequent state, trigger events corresponding to each subsequent state, and queue time value, and
    the second finite state comprises state ID, state sequence number, possible subsequent state, trigger events corresponding to each subsequent state, and queue time value.

13. The system as claimed in claim 9, wherein the trigger event is generated from a trigger point.

14. The system as claimed in claim 9, further comprising a data synchronization unit coupled with the data processing unit, the data synchronization unit being configured to determine whether the trigger event complies with a predetermined control rule, the data synchronization unit further being configured to synchronize transport data between a manufacturing execution system and the material handling system in response to determining that the trigger event complies with the predetermined control rule.

15. The system as claimed in claim 14, wherein the manufacturing execution system is further configured to obtain the transport data by exchanging messages.

16. The system as claimed in claim 15, wherein the manufacturing execution system is further configured to exchange messages in compliance with semiconductor equipment communication standard (SECS) protocol.

17. A computer-readable storage medium storing computer program codes, that when executed by a computer, control a method enabling enhanced data consistency between a material handling system and a manufacturing executing system, comprising:
   codes for defining a queue time;
   codes for modeling behavior and life cycle of a product for the material handling system to obtain a first finite state, a second finite state, designated as temporary or fixed, and a trigger path, wherein the second finite state is selected from a group consisting of a fixed state and a temporary state; and
   codes for generating a trigger event corresponding to the second finite state the triggering event being generated in response to a transfer state changing from the first finite state to the second finite state,
   wherein, in response to the second finite state being the temporary state, the first finite state changes to the second finite state within the queue time.

18. The storage medium as claimed in claim 17, wherein a flag with flag value is set, which being updated when the transfer state changes from the first finite state to the second finite state.

19. The storage medium as claimed in claim 17, wherein the first finite state does not change within the queue time if it is fixed.

20. The storage medium as claimed in claim 17,
   wherein the first finite state comprises state ID, state sequence number, possible subsequent state, trigger events corresponding to each subsequent state, and queue time value, and
   the second finite state comprises state ID, state sequence number, possible subsequent state, trigger events corresponding to each subsequent state, and queue time value.

* * * * *